E. SCHNEIDER.
HYDRAULIC BRAKE FOR GUNS.
APPLICATION FILED MAR. 31, 1919.
1,333,283.
Patented Mar. 9, 1920.
4 SHEETS—SHEET 2.
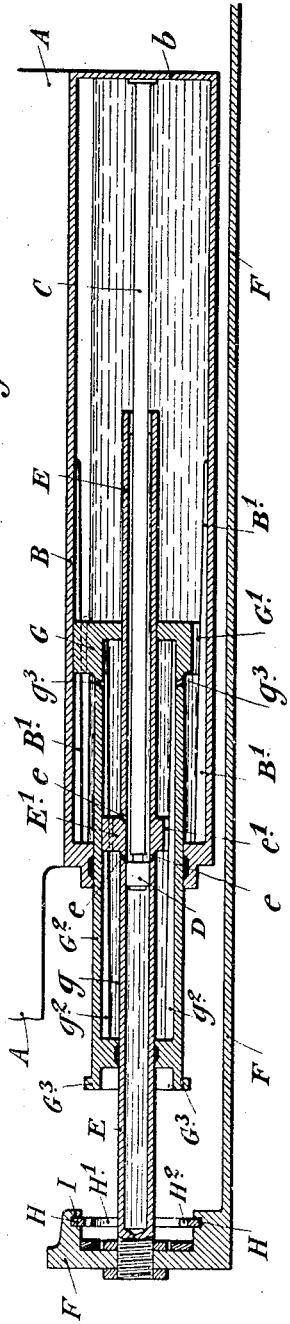
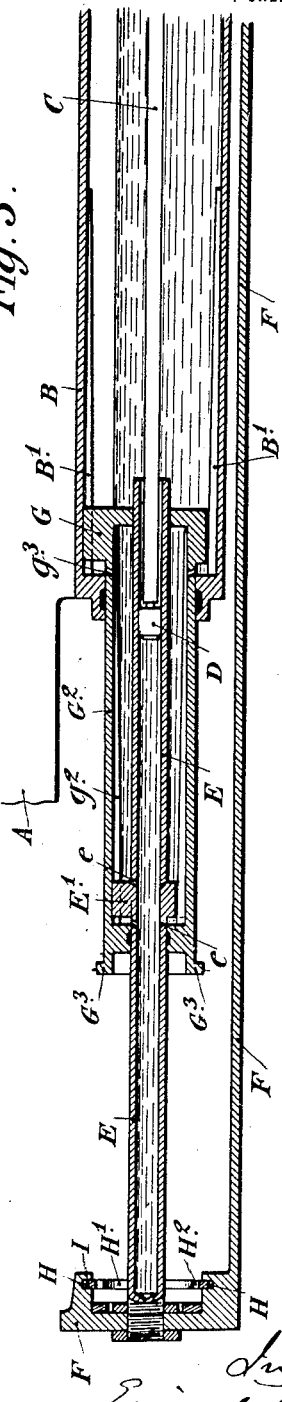

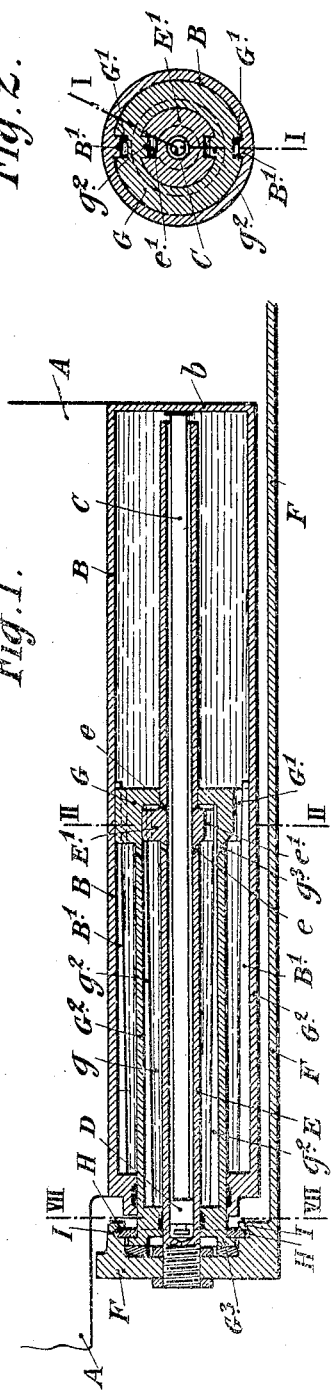

E. SCHNEIDER.
HYDRAULIC BRAKE FOR GUNS.
APPLICATION FILED MAR. 31, 1919.

1,333,283.

Patented Mar. 9, 1920.
4 SHEETS—SHEET 3.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

HYDRAULIC BRAKE FOR GUNS.

1,333,283.   Specification of Letters Patent.   Patented Mar. 9, 1920.

Application filed March 31, 1919. Serial No. 286,495.

*To all whom it may concern:*

Be it known that I, EUGÈNE SCHNEIDER, citizen of the French Republic, and resident of 42 Rue d'Anjou, Paris, France, have invented a new and useful Improved Hydraulic Brake for Guns, which invention is fully set forth in the following specification.

This invention has for its object to provide an improved hydraulic brake for guns, comprising a device of simple construction for diminishing the recoil when firing at high angles of elevation.

The improved brake comprises in a known manner, a brake cylinder fixed to the recoiling part (gun barrel or slide) and carrying on its rear end a rod provided at its free end with a valve for a running out moderator having its chamber fixed to the non-recoiling part (cradle). The braking action is produced by the throttling of the flow of liquid between peculiarly shaped ribs formed on the inner wall of the brake cylinder, and corresponding notches in the piston whereof the piston rod is normally fixed to the cradle.

The characteristic feature of the improved brake consists in this that the piston (in which the moderator chamber is formed and likewise fixed to the cradle) constitutes by means of an annular recess formed around the said chamber, a second brake cylinder in which a piston is adapted to work that projects from the outer wall of the said chamber. This piston-cylinder normally fixed to the cradle and serving the purpose of diminishing the recoil, is left free at low angles of inclination so that it can then follow the recoil movement of the gun barrel. Liquid will then flow from the forward side to the rear side of the piston formed on the moderator chamber. This flow is throttled between ribs formed on the inner wall of the said piston-cylinder and the corresponding notches provided in the piston formed on the moderator chamber, with the result of lengthening the recoil. The means for locking the piston-cylinder and the elevation movements of the gun barrel are inter-connected in such a manner that the said cylinder cannot become unlocked at elevations greater than a given angle, whereas it remains free at elevations below the said angle.

The accompanying drawings illustrate by way of example a constructional form of the improved apparatus.

Figure 1 is a longitudinal section of the brake, on the line I—I of Fig. 2. Fig. 2 is a cross section on the line II—II of Fig. 1. In these two figures the piston-cylinder is assumed to be locked to the cradle, the positions of the parts corresponding to the runout position of the gun barrel.

Fig. 3 is a longitudinal section similar to Fig. 1, showing the positions of the parts at the end of the recoil.

Fig. 4 is a longitudinal section similar to Fig. 1; the piston-cylinder being assumed to be unlocked, and the parts being shown in an intermediate position of the course of the recoil.

Fig. 5 is a section similar to Fig. 4; the parts being shown in the positions they occupy at the end of the recoil.

In these figures, A is the gun barrel of a gun the slide of which contains a brake cylinder B. This cylinder carries on its rear end $b$ a rod C provided in the known manner at its free end with a valve D. The combination C—D works in a chamber E that is fixed to the cradle F. This cylinder B is movable on a piston G and is furnished with ribs $B^1$ of suitable shape engaged in notches $G^1$ in the said piston. The rod $G^2$ of the piston G is hollowed out so as to leave an annular chamber between the wall of the piston cavity and the outer wall of the chamber E of the running-out moderator. This chamber constitutes a brake cylinder in combination with a piston $E^1$ projecting from the side of the running-out moderator chamber E. $g^2$ are suitably shaped ribs projecting from the inner wall of the tubular rod or piston cylinder $g^2$; they are engaged in notches $e^1$ of the piston $E^1$.

Figure 6:
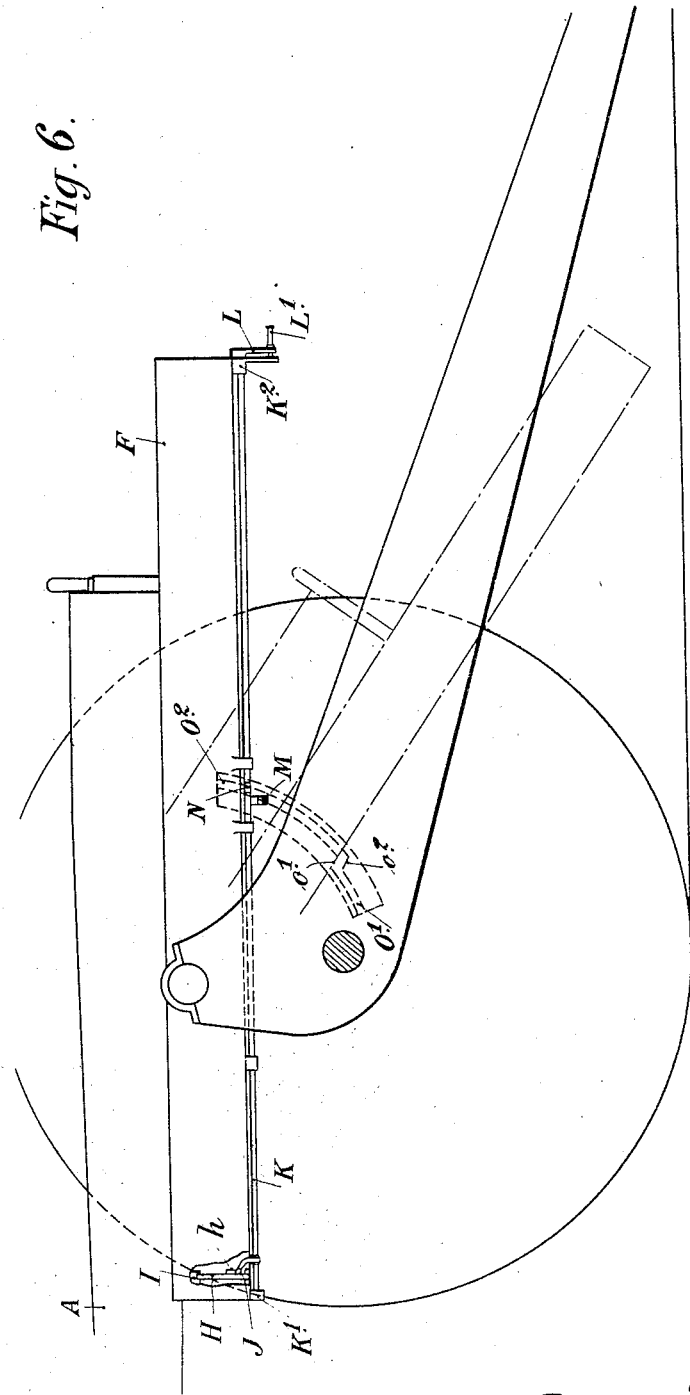
Fig. 6 is a side elevation of a gun provided with the improved brake; it shows more particularly the device for interconnecting the piston-cylinder and the elevation movements of the gun barrel.

The piston cylinder $G^2$ is locked to the cradle F, or is released from the same, so as to be capable of recoiling with the cylinder B, according as the gun barrel is brought into a higher or a lower position of elevation than that shown in Fig. 6.

Figure 7:
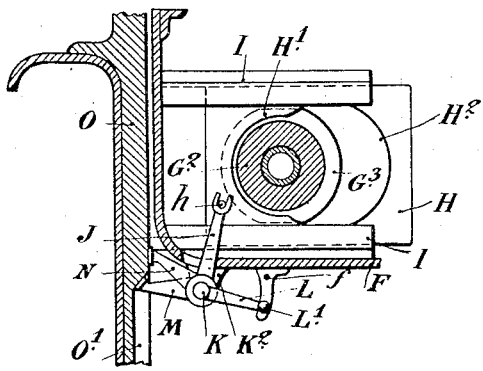
Fig. 7 is a cross section on the line VII—VII of Fig. 1, showing the piston-cylinder locked.

In the example shown, this conjugated locking is effected in the following manner:

The register H which is movable in guides I on the cradle F, is pierced with an aperture H¹—H² composed of two incomplete circular part apertures of different diameters intersecting each other. One part aperture H¹ has a diameter that is slightly greater than the diameter of the piston cylinder G², but smaller than the diameter of a collar G³ formed on the forward end of the said cylinder. The other part aperture H² has a diameter that is greater than the diameter of the said collar. According as the center of the part aperture H², or that of the part aperture H¹ is brought into the geometrical axis of the cylinder G², this cylinder is released (Fig. 8), or is locked by its collar being confined between the register H and the front wall of the cradle (Fig. 7). The shifting of the register H is effected by hand. $h$ is a stud carried by the register and engaged in a fork on the free end of a lever J fixed on a shaft K journaled in bearings K¹, K² under the cradle. On this shaft K there is fixed a crank L whose handle L¹ serves as a catch for engaging the said crank with the cradle F. The latter is provided for this purpose with two rests, $f$, $f^1$. Two tappets M, N are formed or fixed on the shaft K.

When the register H is in its closed position (Fig. 7), the tappet M is engaged in a guide groove O¹ that is carried by or formed in the gun carriage side plate O and shaped according to an arc of a circle having its center in the axis of the trunnions of the gun barrel. The tappet N is then bearing upon a solid portion of the said side plate.

If, on the contrary, the register H is in its open position, the tappet N will then be engaged in an arc-shaped groove O² concentric to the groove O¹, and the tappet M will bear upon a solid portion of the side plate O. The shaft K and the tappets M and N carried by it, are compelled to follow the elevation movements of the gun barrel. The end $o^2$ of the groove O² and the beginning $o^1$ of the groove O¹ are situated at a level such that the tappet M is able to enter the groove O¹ only from the instant when the gun barrel receives an elevation equal to the one indicated by dash-pot lines in Fig. 6, and it will be retained positively for greater angles of elevation. The tappet N can enter the groove O² only at this limit angle of elevation, and is compelled to remain therein at lesser angles of elevation.

When the parts are in the position shown in Figs. 1 and 7, which corresponds to the elevation indicated by dash-dot lines in Fig. 6, the piston-cylinder G—G² is locked by the register H; the tappet M is engaged in the groove O¹ and is at the top of the latter. At any greater angle of elevation the said tappet remains in its groove, while the tappet N is then bearing upon the solid portion of the side plate O.

In the recoil the cylinder B moves along on the piston-cylinder G—G², whereas the latter remains stationary. The liquid is forced from the forward side to the rear side of the piston G; an increasing throttling action being opposed to the flow of the said liquid by the movement of the shaped ribs B¹ in the notches G¹.

Fig. 3 shows the parts in the position they occupy at the end of the shortened recoil. The liquid forced into the forward chamber of the cylinder B, transmits its pressure through the passages $g^3$ to the liquid which is contained in the annular chamber $g$ and which can escape in its turn through the orifices $e$. The valve D is forced off its seat, and the liquid that is forced out through the orifices $e$, fills the chamber E of the running-out moderator wherein a partial vacuum is produced as a result of the recoil of the rod C.

Figure 8:
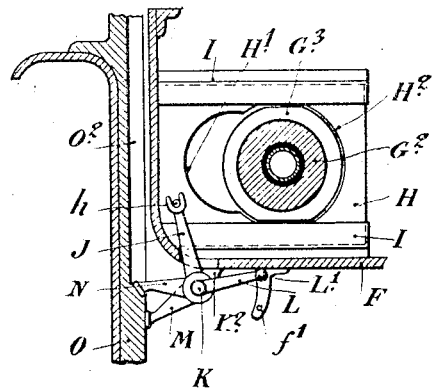
Fig. 8 is a similar cross section, after the gun barrel has been moved into a position of sufficiently low elevation to allow of unlocking the piston-cylinder.

If, starting out from the position indicated by dash-dot lines in Fig. 6, it is desired to give a smaller elevation to the gun barrel, it will be necessary first to move the register H into the position shown in Fig. 8 wherein it releases the piston-cylinder G—G². It is at that moment only that the tappet N, which was bearing against the solid portion of the side plate O, is able to enter the groove O², whereupon the gun barrel can be elevated by means of the usual elevating mechanism. When the gun barrel is in any one of the positions of low elevation, the recoil will take place under a braking action produced by means of two brakes, one of which moves telescopically over the other.

The improved apparatus constitutes practically a telescopic brake composed of two elements one only of which operates, in order to diminish the recoil while the other element is locked; whereas both the elements operate together when by moving the gun barrel into a position of sufficiently low elevation, it has become possible to unlock the said other element.

What I claim is:

1. In hydraulic brake apparatus for guns, the combination of a brake cylinder and a valved moderator rod both movable with a recoiling part of the gun, concentric piston cylinders in communication with each other and with said brake cylinder, one of which is fast to a non-recoiling part of the gun and adapted to receive said moderator rod, the other of which has a detachable connection with said non-recoiling part of the gun, recoil brake pistons on said piston cylinders one of said pistons being operative for all relative positions of the brake cylinder and said detachable piston cylinder and the other piston being operative only on release of said piston cylinder.

2. In hydraulic brake apparatus for guns, the combination of a brake cylinder and a valved moderator rod both movable with a recoiling part of the gun, concentric piston cylinders in communication with each other and with said brake cylinder one of which is fast to a non-recoiling part of the gun and adapted to receive said moderator rod, the other of which is provided with a detachable connection with said non-recoiling part comprising; a collar on said piston cylinder, a slide member on the non-recoiling part of the gun having an opening struck on different radii for receiving said piston cylinder and manual means for operating said slide member which, when in engagement with said collar, locks the cylinder in position for firing at high angles of elevation and, when out of engagement, releases the cylinder for firing at low angles of elevation.

3. In hydraulic brake apparatus for guns, the combination of a brake cylinder and a valved moderator rod both movable with a recoiling part of the gun, concentric piston cylinders in communication with each other and with said brake cylinder, one of which is fast to a non-recoiling part of the gun and adapted to receive said moderator rod, the other of which is provided with a detachable connection with said non-recoiling part, a manually operated rod for operating said connection and means controlling the operation of said rod comprising grooves on said stationary part, and tappets on said rod adapted to enter one or the other of said grooves according as the gun has a greater or smaller elevation than a predetermined elevation.

4. In hydraulic brake apparatus for guns, the combination of a brake cylinder and a valved moderator rod movable with a recoiling part of the gun, concentric piston cylinders therein in throttled communication with each other and with said cylinder, one of which is detachably connected to a non-recoiling part of the gun and the other being fast thereto and adapted to receive said moderator rod, recoil brake pistons on said piston cylinders one of said pistons being operative for all relative positions of the brake cylinder and said detachable piston cylinder, means for releasing said cylinder and means controlling the operation of said release means for elevations of the gun greater or smaller than a predetermined elevation.

In testimony whereof I have signed this specification.

EUGÈNE SCHNEIDER.